United States Patent
Klish, II et al.

(10) Patent No.: US 6,757,306 B1
(45) Date of Patent: Jun. 29, 2004

(54) METHOD AND SYSTEM FOR INTERMEDIATE SYSTEM LEVEL 2 TRANSPARENCY USING THE SONET LDCC

(75) Inventors: Cypryan T. Klish, II, Raleigh, NC (US); Jeff G. Henderson, Nepean (CA); John H. MacAuley, Stittsville (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/391,031

(22) Filed: Sep. 7, 1999

(51) Int. Cl.[7] ................................................. H04J 3/02
(52) U.S. Cl. ...................................... 370/539; 370/541
(58) Field of Search ................................ 370/539, 541, 370/401–407, 252, 255

(56) References Cited

U.S. PATENT DOCUMENTS

| | | | | |
|---|---|---|---|---|
| 5,262,906 A | * | 11/1993 | Mazzola | 370/255 |
| 5,265,096 A | * | 11/1993 | Parruck | 370/216 |
| 5,461,624 A | * | 10/1995 | Mazzola | 370/402 |
| 5,923,653 A | * | 7/1999 | Denton | 370/375 |
| 6,078,596 A | * | 6/2000 | Wellbrock | 370/352 |
| 6,256,292 B1 | * | 7/2001 | Ellis et al. | 370/227 |
| 6,314,093 B1 | * | 11/2001 | Mann et al. | 370/351 |
| 6,377,542 B1 | * | 4/2002 | Asprey | 370/222 |

OTHER PUBLICATIONS

Ambrosoll et al., TMN Architecture for SDH Networks Using IS–IS . . . , Alcatel Telecom, p. 223–227.

* cited by examiner

*Primary Examiner*—Ajit Patel
*Assistant Examiner*—Chirag Shah
(74) *Attorney, Agent, or Firm*—Nortel Networks

(57) ABSTRACT

Methods and apparatus for assigning and/or storing routing metric values for routing traffic in a network having line terminating equipment connected by an line data communications channel (LDCC), so that routing traffic is sent across the LDCC. These methods and systems include a node and network that use the LDCC for transmitting routing information, such as Intermediate System to Intermediate System Level 2 routing traffic.

23 Claims, 4 Drawing Sheets

METHOD AND SYSTEM FOR INTERMEDIATE SYSTEM LEVEL 2 TRANSPARENCY USING THE SONET LDCC

BACKGROUND OF THE INVENTION

The present invention relates generally to the transmission of data in a synchronous optical network, and more particularly, to transmitting routing traffic in a synchronous optical network.

As shown in FIG. 1, there are three layers in a Synchronous Optical Network (SONET) architecture. These layers include a section, a line, and a path. A section concerns communications between two adjacent network elements, referred to as a section terminating equipment (STE) 110-1 through 110-6. Regenerators 140-1 and 140-2 and add-drop multiplexers (ADM) 150-1 and 150-2 are examples of STE.

A line concerns communications between line terminating equipment (LTE) 120-1 through 120-4, such as ADMs 150-1 and 150-2. As shown in FIG. 1, a line includes one or more sections. LTEs 120-1 through 120-4 perform line performance monitoring and automatic protection switching. Regenerators generally are not LTEs, although add-drop multiplexers typically include both an STE and an LTE.

An end-to-end connection is called a path and the equipment on either end that sends or receives a signal is called path-terminating equipment (PTE) 130. As shown in FIG. 1, a path includes one or more lines, each of which includes one or more sections.

SONET includes a section data communications channel (SDCC) providing a 192 kbps channel and a Line Data Communications Channel (LDCC) providing a 576 kbps channel.

SONET presently uses the Intermediate System to Intermediate System (IS-IS) level 2 routing protocol for exchanging routing traffic between Intermediate Systems in different areas within the same routing domain. An Intermediate System is typically defined as a router.

Presently, IS-IS level 2 traffic is sent over the SDCC. As stated above, the SDCC provides only a 192 kbps channel, which at present is heavily used. As currently defined, the SDCC does not have a priority mechanism for determining which information can be discarded when the SDCC channel is overloaded. Therefore, in the event the capacity of the SDCC channel is exceeded, the stack discards information without any intelligent discrimination. This can result in the loss of vital messages and lead to network failures.

Because the IS-IS level 2 protocol requires a contiguous backbone of IS Level 2 capable network elements, using the SDCC for IS-IS level 2 traffic, increases the costs of STE only equipment, such as regenerators. Because STE-only network elements are low end, cost sensitive devices, this can greatly increase network costs.

Thus, it is desirable to have a method and system for intermediate system level 2 transparency that overcomes the above and other disadvantages of the prior art.

SUMMARY OF THE INVENTION

Methods and systems consistent with the invention, as embodied and broadly described herein, comprise the step of assigning routing metric values for sending routing traffic in a network having line terminating equipment connected by an LDCC, such that routing traffic is sent across the LDCC.

In another embodiment, such methods and systems comprise a node that includes means for storing routing metric values for an LDCC and an SDCC, and means for placing routing traffic on the LDCC.

In another embodiment, such methods and systems comprise a network that includes means for assigning routing metric values to LDCC links, means for assigning routing metric values to SDCC links, means for computing a routing metric from the assigned routing metric values, and means for determining from the computed routing metrics whether to place routing traffic on the LDCC or SDCC, wherein the routing metric values are assigned such that the routing traffic is placed on the LDCC.

The summary of the invention and the following detailed description should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

DETAILED DESCRIPTION

Reference will now be made in detail to the preferred embodiments of the invention, examples of which are illustrated in the accompanying drawings. Wherever possible, the same reference numbers will be used throughout the drawings to refer to the same or like parts.

Figure 1:
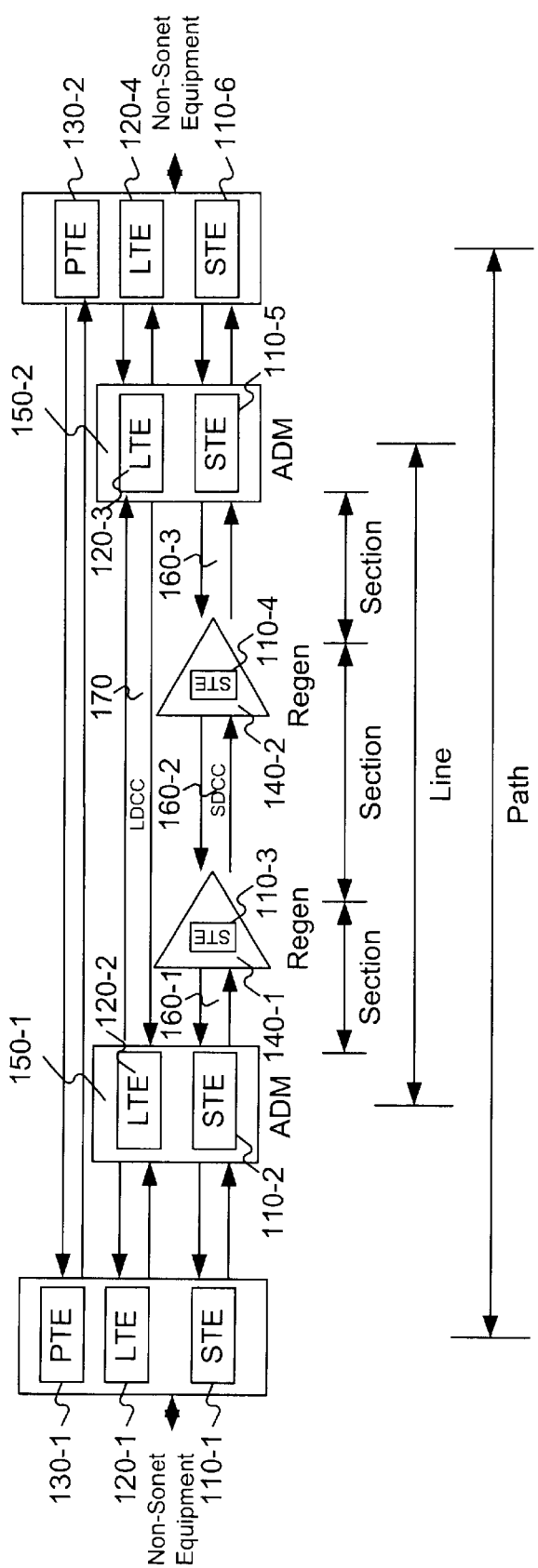
FIG. 1 is an illustration of a SONET network.

As shown in FIG. 1, there are three types of equipment within a SONET network element: path terminating equipment (PTE) 130-1 and 130-2, line terminating equipment (LTE) 120-1 through 120-4, and section terminating equipment (STE) 110-1 through 110-6. In addition, FIG. 1 shows a section data communications channel (SDCC) 160 connecting STE 110-1 thru STE 10-6 and a line data communications channel (LDCC) 170 connecting LTE 120-1 thru LTE 120-4.

Although the detailed description is directed to the invention's use with SONET, the invention is equally applicable to synchronous digital hierarchy (SDH).

In a preferred embodiment, the LDCC is used to carry IS-IS Level 2 traffic. This is preferably accomplished by setting routing metric values for the links between LTEs to a value that is less than the sum of the routing metrics for the SDCC links between the LTEs.

As shown in FIG. 1, two LTEs, for example LTE 120-2 and LTE 120-3, are linked by a single LDCC 170 and through STEs 110 by three SDCC links 160-1, 160-2, and 160-3. In a preferred embodiment, routing metric values are assigned to the LDCC 170 and the three SDCC links 160-1, 160-2, and 160-3 in such a manner that the system sends IS-IS Level 2 routing traffic over the LDCC 170.

The system sends routing traffic over the channel with the lowest computed routing metric, where the computer routing metric is the sum of the routing metric values for each link of the connection between the nodes of interest. For example, if the routing metric value for the LDCC is set to 10, and the three SDCC links are each assigned a routing metric of 5, then the sum of the three SDCC links routing metric values is 15. As such, the IS-IS Level 2 traffic is sent across the LDCC because the sum of the routing metric values over the LDCC is less than the sum of the routing metric values for the three SDCC links. If, however, the routing metric value for the LDCC link is set to 20, then the IS-IS Level 2 traffic is sent across the three SDCC links.

Figure 2:
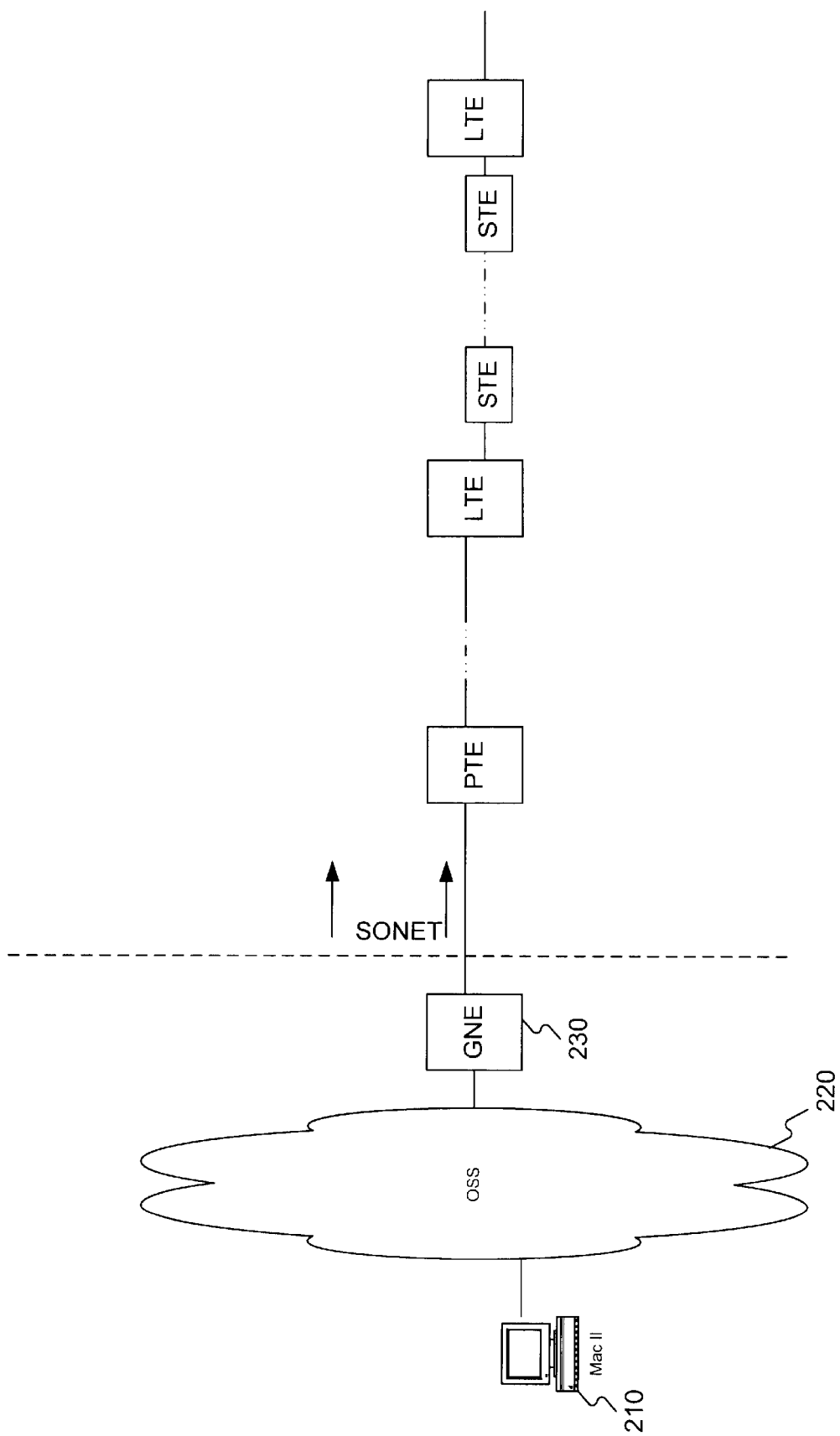
FIG. 2 is an illustration of a SONET network connected to an OSS for network management, in accordance with methods and systems consistent with the invention.

FIG. 2 provides a block diagram of a SONET network 100, which is connected via a Gateway Network Element (GNE) 230 to an Operations Support System (OSS) 220 connected to a computer 210 in accordance with an embodiment of the invention. From computer 210, a network administer manages the SONET network 100.

Figure 3:
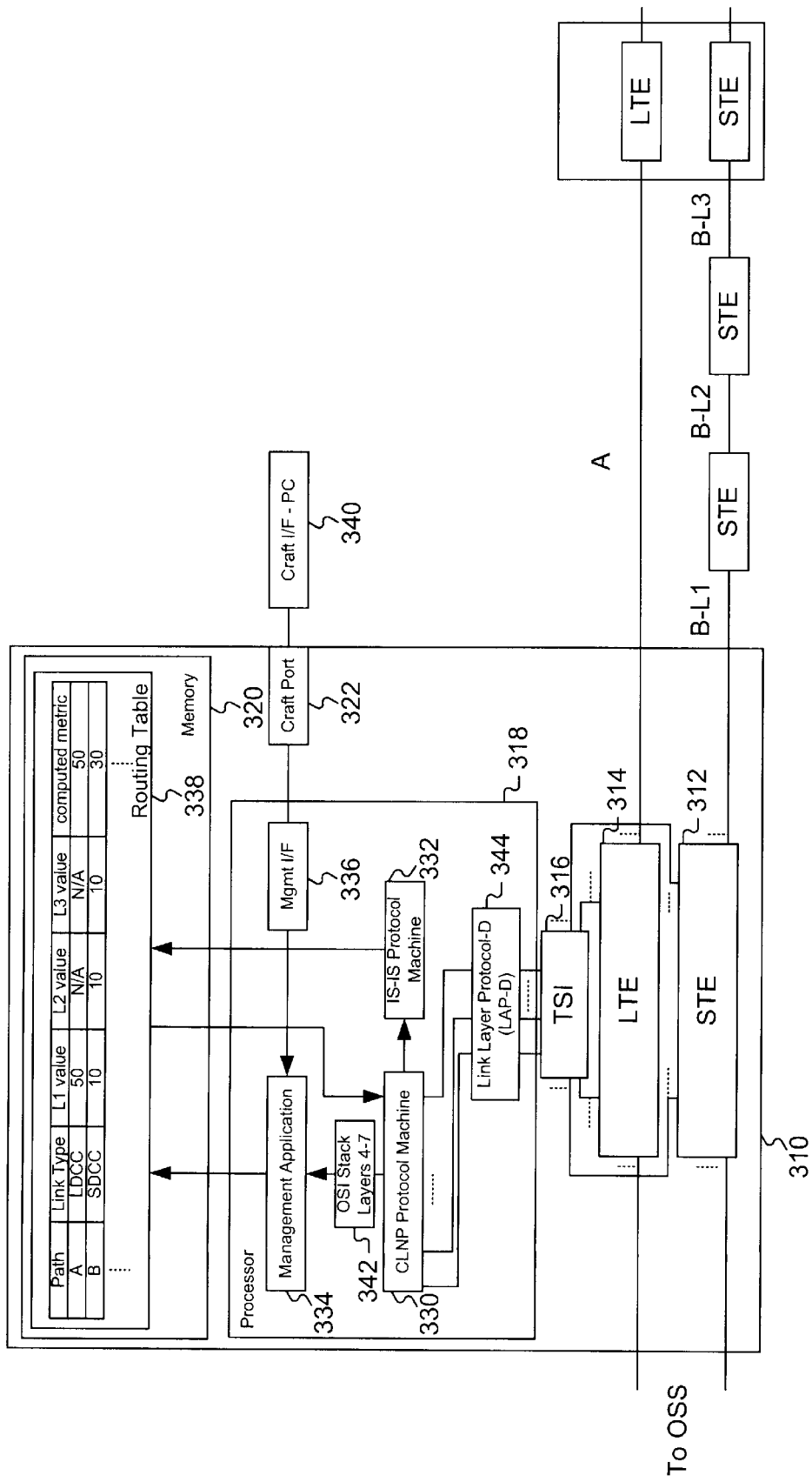
FIG. 3 is a block diagram of a prior art add drop multiplexer configured to send routing traffic over the SDCC.

FIG. 3 provides a more detailed block diagram of an Add Drop Multiplexer (ADM) 310, in accordance with an embodiment of the invention. As shown, ADM 310 includes STE 312, LTE 314, a TSI 316, a processor 318, memory 320, and a craft port 322. The processor 318, preferably, includes a Connectionless Network Protocol (CLNP) machine 330, a IS-IS protocol machine 332, a management application 334, and a management interface 336, an OSI stack layers 4-7 machine 342, and a Link Access Protocol-D (LAP-D) machine 344. The memory 320, preferably, includes an IS-IS routing table 338.

In a preferred embodiment, when a network administrator wishes to change the routing metric values in ADM 310's routing table, the administrator enters appropriate instructions through the computer 210 connected to OSS 220. These instructions are then routed from the OSS 220 to the appropriate GNE 230, after which, they are routed through the SONET network 100 to the proper ADM 310 over either the LDCC or SDCC, depending on the current routing metric values. The instructions are then routed by the LTE 312 or STE 314, respectively, to the TSI 316 where they are routed through the Link Access Protocol-D (LAP-D) machine 344 to the CLNP protocol machine 330 of the processor 318. The CLNP protocol machine 330 then sends the instructions up through the OSI stack layers 4-7 machine 342 to the management application 334, which makes the appropriate changes to the IS-IS routing table 338 in memory 320.

In another embodiment, a network administrator makes changes to the IS-IS routing table 338 though a computer 340, also referred to as a craft interface, connected to the ADM 310 via a craft port 322. The network administrator sends instructions from the computer 340 to the ADM 310 through craft port 322, which sends the instruction to the management interface 336 of the processor 318. The management interface 336 then sends the instructions to the management application 334, which makes the appropriate changes to the routing table 338 in memory 320.

In addition, to receiving IS-IS routing traffic from a network administrator, network elements, such as ADM 310, may also exchange IS-IS routing traffic amongst themselves. In a preferred embodiment, this information is received by ADM 310 and routed to the CLNP Protocol Machine 330, which sends the information to the IS-IS protocol machine 332. The IS-IS protocol machine 332 then examines the information and makes the appropriate changes in the routing table 338 in memory 320.

In a preferred embodiment, through any of the methods and systems described above, the routing tables of the various LTEs in a SONET network can be set such that all IS-IS Level 2 traffic is sent over the LDCC rather than the SDCC. For example, as shown in FIG. 3, the routing table is set such that the computed routing metric for sending IS-IS Level 2 traffic results in the traffic being sent across the SDCC. This is because there is one LDCC link between LTEs with a routing metric value of 50, and three SDCC links, each with a routing metric value of 10. As such, the computed routing metric for sending traffic across the LDCC is 50, and the computed routing metric for the SDCC is 30, or 10+10+10. Because the computed routing metric for sending the IS-IS Level 2 traffic over the SDCC is less than the computed metric for sending the traffic over the LDCC, the routing traffic is sent over the SDCC. Thus, as previously discussed, STE-only equipment, such as regenerators, must be an IS Level 2 capable network element.

In an embodiment, a processor, such as processor 318, computes the sums of routing metric values, and determines on which link to place the IS-IS Level 2 traffic. Further, in an embodiment, a processor running the OSI stack protocols, which, for example, may also be processor 318, places the IS-IS Level 2 traffic on the determined link. Also, as will be obvious to one skilled in the art, separate processors can be used to implement these various functions.

Figure 4:
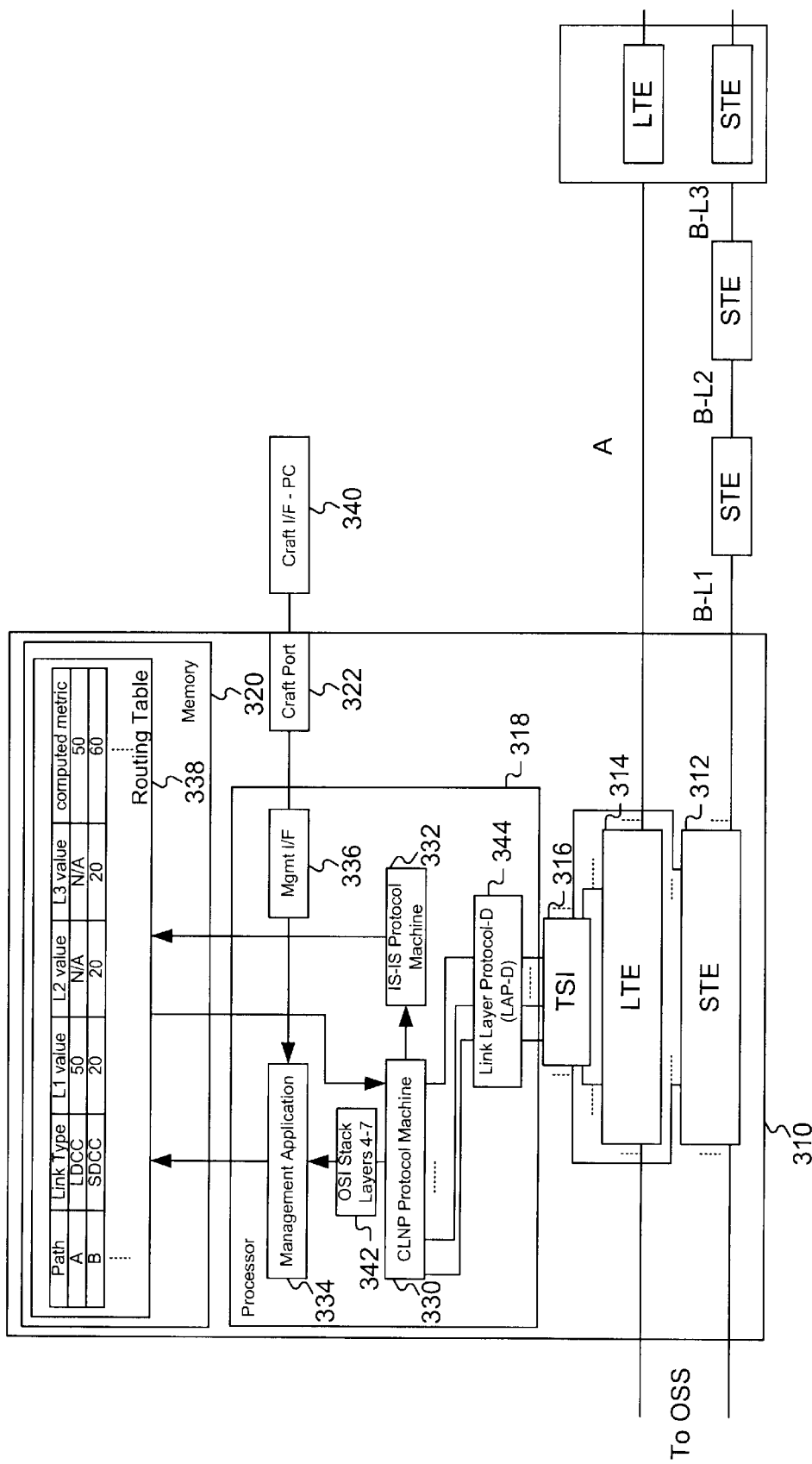
FIG. 4 is a block diagram of an add drop multiplexer configured to send routing traffic over the LDCC, in accordance with methods and systems consistent with the invention.

FIG. 4 provides a block diagram of ADM 310, after the routing table has been adjusted so that IS-IS level 2 traffic is sent across the LDCC, in accordance with an embodiment of the invention. As shown, the assigned routing metric value for the LDCC is 50, while the assigned routing metric value for each SDCC link is now 20. As such, the computed metric value for sending the traffic over the SDCC is 60, while for the LDCC it is still 50. As such, the IS-IS Level 2 traffic is now sent across the LDCC. Accordingly, the intervening STE-only equipment need not be IS Level 2 capable.

While it has been illustrated and described what is at present considered to be the preferred embodiment and methods of the present invention, it will be understood by those skilled in the art that various changes and modifications may be made, and equivalents may be substituted for elements thereof without departing from the true scope of the invention.

In addition, many modifications may be made to adapt a particular element, technique or, implementation to the teachings of the present invention without departing from the central scope of the invention. Therefore, it is intended that this invention not be limited to the particular embodiment and methods disclosed herein, but that the invention includes all embodiments falling within the scope of the appended claims.

What is claimed is:

1. In a network having a plurality of line terminating equipment in communication with each other over a line, the line including one or more sections, each line terminating equipment being capable of communicating over the line using a line data communication channel and a section data communication channel, and wherein one or more point-to-point line data communications channel links form a first path between a first node and a second node, and one or more point-to-point section data communications channel links form a second path between the first node and the second node, a method for transmitting routing information, the method comprising:

computing a first metric value by computing a sum of routing metric values for the point-to-point line data communications channel links that form the first path between the first node and the second node;

computing a second metric value by computing a sum of routing metric values for the point-to-point section data communications channel links that form the second path between the first node and the second node; and transmitting Intermediate System to Intermediate System Level 2 routing information over the first path instead of over the second path based on the computed sums.

2. The method of claim 1 wherein the network carries SONET traffic.

3. The method of claim 1 wherein the network carries SDH traffic.

4. A node capable of communicating over a line using a line data communication channel and a section data communication channel, the node comprising:

one or more point-to-point line data communications channel links forming a first path between the node and a second node;

one or more point-to-point section data communications channel links forming a second path between the node and the second node;

memory storing a first metric value associated with transmitting signals over the first path and a second metric value associated with transmitting signals over the second path; and a processor computing the first metric value by computing a sum of routing metric values for the point-to-point line data communications channel links that form the first path between the node and the second node, and computing the second metric value by computing a sum of routing metric values for the point-to-point section data communications channel links that form the second path between the node and the second node.

5. The node of claim 4 wherein the network carries SONET traffic.

6. The node of claim 4 wherein the network carries SDH traffic.

7. The node of claim 4 wherein the routing information is Intermediate System to Intermediate System Level 2 information.

8. The node of claim 4 wherein the node is an add-drop multiplexer.

9. A network, comprising:

a plurality of line terminating equipment connected by a line data communications channel, each line terminating equipment comprising:

means for storing a first metric value associated with transmitting signals over a line data communication channel and a second metric value associated with transmitting signals over a section data communication channel;

means for accessing the first and second metric values stored in the memory and for determining to transmit signals representing routing information over the line data communication channel instead of over the section data communication channel based on the first and second metric values;

means for computing the first metric value by computing a sum of routing metric values for one or more line data communications channel links that form a first path between a pair of line terminating equipment; and means for computing the second metric value by computing a sum of routing metric values for one or more section data communications channel links that form the second path between the pair of line terminating equipment.

10. The network of claim 9 wherein the network carries SONET traffic.

11. The network of claim 9 wherein the network carries SDH traffic.

12. The network of claim 9 wherein the routing information is Intermediate System to Intermediate System Level 2 information.

13. The network of claim 9 wherein one of the line terminating equipment is an add-drop multiplexer.

14. In a communications network, a node capable of communicating over a line data communication channel and a section data communication channel, the node comprising:

means for storing a first metric value associated with transmitting signals over the line data communication channel and a second metric value associated with transmitting signals over the section data communication channel;

means for accessing the first and second metric values and for determining to transmit signals representing routing information over the line data communication channel instead of over the section data communication channel based on a comparison of the first and second metric values;

means for computing the fact metric value by computing a sum of routing metric values for one or more point-to-point line data communications channel links that form a first path between the node and the second node; and means for computing the second metric value by computing a sum or routing metric values for one or more point-to-point section data communications channel links that form a second path between the node and the second node.

15. The node of claim 14 wherein the network carries SONET traffic.

16. The node of claim 14 wherein the network carries SDH traffic.

17. The node of claim 14 wherein the routing information is Intermediate System to Intermediate System Level 2 information.

18. The node of claim 14 wherein the node is an add-drop multiplexer.

19. A node in a network having a plurality of line terminating equipment connected by a line data communications channel and a plurality of section terminating equipment connected by a section data communications channel, and wherein one or more point-to-point line data communications channel links form a first path between the node and a second node, and one or more point-to-point section data communications channel links form a second path between the node and the second node, the node comprising:

a storage for storing a routing metric value for a line data communications channel link and for storing a routing metric value for a section data communications channel link; and a processor for placing routing information on the line data communications channel, for computing a sum of routing metric values for the point-to-point line data communications channel links that form the first path between the node and the second node, a sum of routing metric values for the point-to-point section data communication channel links that forms the second path between the node and the second node, and for determining from the computed sums on which of the first and second paths to place the routing information; and wherein the routing metric values are assigned such that the determined path is the line data communications channel.

20. The node of claim 19 wherein the routing information is Intermediate System to Intermediate System Level 2 information.

21. The node of claim 19 wherein the network carries SONET traffic.

22. The node of claim 19 wherein the network carries SDH traffic.

23. The node of claim 19 wherein the node is an add-drop multiplexer.

* * * * *